July 3, 1923.
E. D. CHURCH ET AL
AUTOMATIC MEASURING DEVICE
Filed May 10, 1922
1,460,573
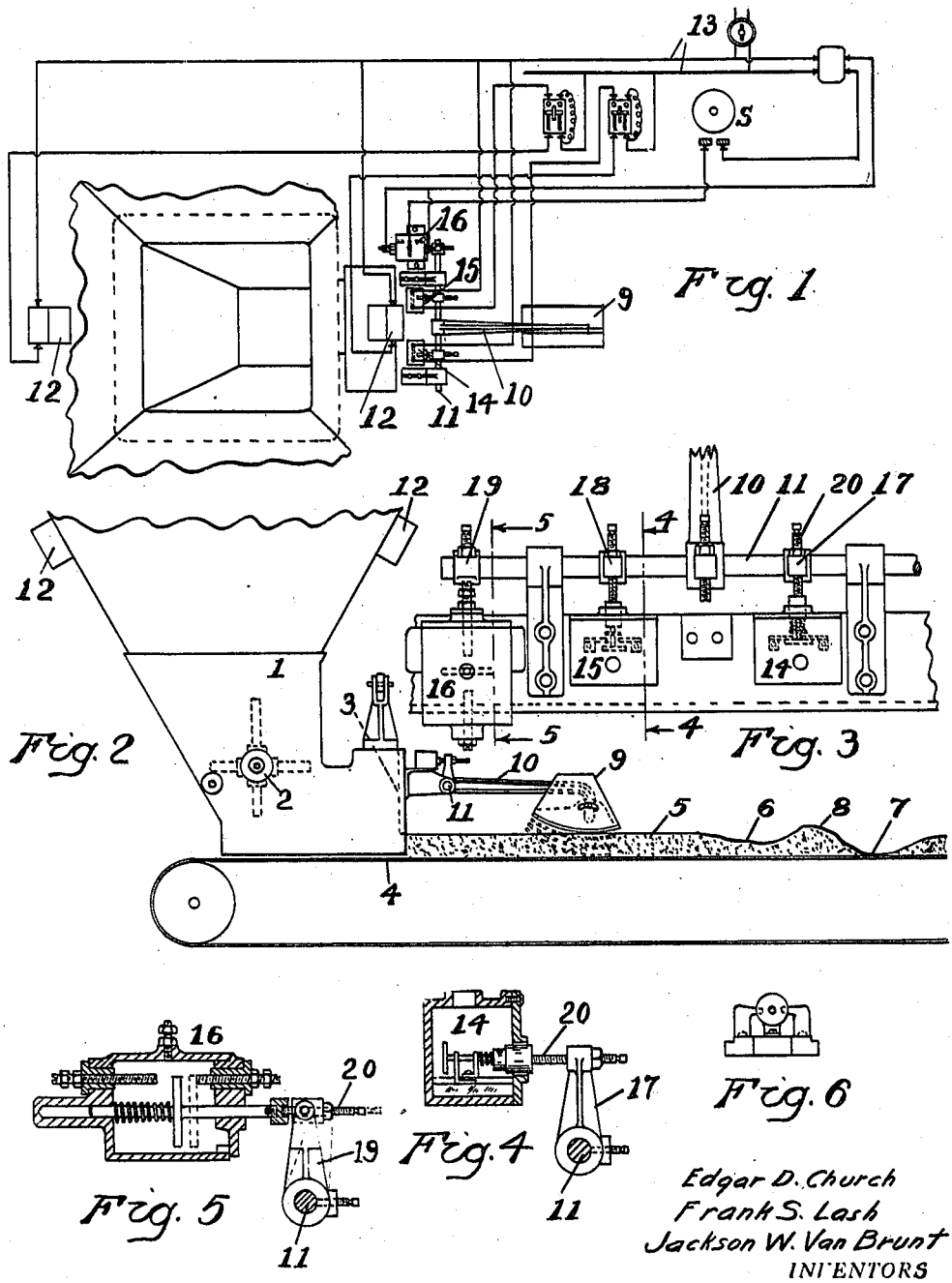
Edgar D. Church
Frank S. Lash
Jackson W. Van Brunt
INVENTORS
ATTORNEY Patented July 3, 1923.

1,460,573

UNITED STATES PATENT OFFICE.

EDGAR D. CHURCH, FRANK S. LASH, AND JACKSON W. VAN BRUNT, OF SAGINAW, MICHIGAN, ASSIGNORS TO JACKSON & CHURCH COMPANY, OF SAGINAW, MICHIGAN, A CORPORATION OF MICHIGAN.

AUTOMATIC MEASURING DEVICE.

Application filed May 10, 1922. Serial No. 559,929.

*To all whom it may concern:*

Be it known that we, EDGAR D. CHURCH, FRANK S. LASH, and JACKSON W. VAN BRUNT, citizens of the United States, residing at Saginaw, in the county of Saginaw and State of Michigan, have invented certain new and useful Improvements in Automatic Measuring Devices; and we do hereby declare the following to be a full, clear, and exact description of the invention, such as will enable others skilled in the art to which it appertains to make and use the same.

This invention relates to measuring devices and pertains more particularly to that class of measuring devices adapted for the measuring of materials such as lime or the like while being fed from a storage hopper onto a belt conveyor, or its equivalent.

The improvement pertains more particularly to means whereby the hopper from which the material is being fed will be automatically agitated or rapped, causing the material to feed more freely whenever the thickness of the layer of material delivered on the belt becomes less than the predetermined thickness which the hopper feed gate is adjusted to deliver.

While our improvement is adapted to the handling of any suitable material, it is more especially designed for purposes, such for example, as controlling the supply of powdered lime and sand delivered to the mixers in sand lime brick manufacturing plants.

In such plants the sand is supplied to the mixer from a hopper and the lime is supplied from another hopper, each of the materials traveling separately to the mixer on an endless belt conveyor or its equivalent.

The gate of exit from the sand hopper and the exit gate from the lime hopper are usually adjusted to deliver to their respective conveyors a predetermined thickness of material, and the speed ratio of the two belts is usually such that the desired volumetric quantities of sand and lime are automatically delivered to the mixer.

If the feed from both hoppers is uniform the predetermined thickness of materials on the belts, and consequently the proper mixing proportions of the materials will be maintained. On the other hand, if the rate of feed from, say, the lime hopper, is liable to change due to the material "hanging" or "bridging" in the hopper, it becomes necessary to agitate the material in the hopper.

Heretofore it has been customary to provide the hopper with agitating devices, such as hand-actuated or mechanical rappers that strike upon the sides of the hopper to dislodge the hanging material and thereby restore the proper flow down the sides of the hopper.

The purpose of our present invention is to control the operation of these agitating or rapping devices so that they will remain inactive if the proper thickness of material is maintained on the belt, but if the layer of material on the belt becomes thin the hopper agitators start automatically.

A further object of our invention is to provide means whereby, if the thinning of the layer on the belt is not excessive, only one agitator will be put into action, but if there is a considerable thinning of the layer, both agitators will be operated. Furthermore, if the supply from the hopper to the belt ceases and the layer on the belt consequently becomes very thin, then not only will both agitators be put into action, but a signal such as an electric gong, or a light, or both, will also be automatically operated. By this arrangement the attendant knows, if he hears one of the agitators operating, that the layer of material on the belt is becoming somewhat thinner than desired, and if he hears both agitators, he knows that the supply of material is considerably reduced. When he hears both agitators and the gong and sees the signal light, he knows that the desired supply of material to the mixer has dwindled to such an amount as to endanger the commercial value of the final mixture, and he thereupon stops the mixer until the defect is remedied.

With the foregoing and certain other objects in view which will appear later in the specification, our invention comprises the devices described and claimed and the equivalents thereof.

In the drawings, Fig. 1 is a top plan view of the device and a wiring diagram for the same, the conveyor belt omitted.

Fig. 2 is a side elevation of parts shown in Fig. 1, showing the belt in place.

Fig. 3 is an enlarged fragmentary plan view, partly broken away, showing the contact devices.

Fig. 4 is an enlarged section on line 4—4 of Fig. 3.

Fig. 5 is an enlarged section on line 5—5 of Fig. 3.

Fig. 6 is a rear end elevation of the contact members shown in Fig. 4, the casing omitted.

As is clearly shown in the drawings, the device consists in the usual hopper 1 containing a suitable feed device or stirrer 2 and a gate 3 adapted to be adjusted to the desired height above a conveyor belt or equivalent carrier 4, so as to deliver, under proper feed conditions, a uniform layer of material 5.

If for any cause, such as "hanging" or bridging of the material in the hopper, the outflow is reduced, resulting in the layer becoming thin, as indicated at 6, one of the agitators, as 12, will be operated to dislodge the material in the hopper, preferably by rapping on the hopper wall. If the layer of material on the belt becomes quite thin, both agitators 12, 12 will be started. If it happens that a part, as 8, is delivered thicker than normal, as when gate 3 is lifted above its properly adjusted position, a gong or light signal S will operate. If the layer becomes exceedingly thin, as at 7, both of the agitators and also the light or gong signal will operate simultaneously, as will be more fully described.

To accomplish these results we provide a vertically movable rider 9, which may be in the form of a sliding shoe of sheet metal, or a roller or any equivalent thereof, the curved or otherwise suitably shaped lower surface of which is adapted to ride upon the top surface of the traveling layer of material. Rider 9 is preferably mounted on an arm 10 fixed to a rocker shaft 11 which may be carried on any fixed part, as a bracket attached to any stationary support.

The vibrators or knockers 12 are preferably of any well-known electric vibrator type as for example that shown in U. S. Patent No. 1,324,930 and are electrically connected in any suitable manner, as for example, that shown diagrammatically in the wiring diagram, Fig. 1, to a source of electric current, such as the power line or lighting circuit 13.

We preferably locate a plurality of electric contact devices as 14, 15, 16 in proximity to the shaft 11, supporting them on stationary brackets as shown in Fig. 2. Adjacent each of the contact devices and fixed to shaft 11 is an arm, as 17, 18, 19, each arm provided with a laterally projecting pin or screw 20 operatively connected to the contact points or discs of the respective contact devices. The structure of the contact devices is illustrated in Figs. 4, 5 and 6. A contact disk is movable laterally toward or away from suitable contact points, by means of the actuating screw 20 on arm 19. Physical contact being established between the disk and a contact point, the current passes, and is broken when the disk is moved away from the pin. Preferably the relative adjustment of the pins 20 is such that one contact device, as 14, will first make its contact, after which, upon continued downward movement of rider 9, contact will be made in 15 and upon a still further downward movement of the rider 9, contact will be established in 16.

Contact device 14 is electrically connected with one of the agitators 12, 15 is connected to the other, and 16 may be connected either to a gong or to a light or other signal S, so that abnormal movement of rider 9, either up or down, will cause contact to be established in 16, operating signal S. It is thus seen that any downward movement of the vertically movable rider 9 below the normal level of the layer 5, as indicated by the dotted lines in Fig. 2, will result in the progressive operation of, first, one agitator, then both agitators, as the layer becomes thinner, and finally both agitators and also the signaling device.

In Figs. 4 and 5, we have shown the details of the preferred construction of contact members 14 and 16 respectively.

In Fig. 6 we have shown the rear elevation of the working parts or contact terminals of the member illustrated in Fig. 4.

The details of construction of all of these contact devices are well known in the art and further reference to their arrangement and operation need not here be made, it being merely required for the purpose of our present invention as set forth in the claims, that suitable make-and-break devices be employed in conjunction with the agitators 12 and actuated by the vertically movable rider 9, and that the necessary electric connections between the contact members and the agitators be provided in any desired manner.

By the means above described we have produced a simple and relatively inexpensive, yet reliable and durable device that automatically agitates the feed hopper when the flow therefrom decreases below a predetermined amount. Immediately the flow is thereby restored to normal, the rider 9 resumes its original position and the contact members automatically thereupon discontinue the operation of the agitators 12.

Having thus described our invention, what we claim and desire to secure by Letters Patent is:

1. In combination, a hopper, electrically actuated vibrators on the walls of said hopper, a conveyor beneath said hopper, a rider vertically movable above said conveyor, contact devices electrically connected to said vibrators, means operatively connecting said rider and said contact devices adapted to actuate said contact devices in succession, one of said contact devices electrically connected to a vibrator, a second contact device connected to another vibrator, and a third contact device adapted to actuate signals, for the purposes set forth.

2. In combination, a hopper, vibrators on the walls of said hopper, a conveyor beneath said hopper, a rider vertically movable above said conveyor, electric contact devices, each adapted to close a circuit to operate one of said vibrators, means connecting said rider and said contact devices in succession during the downward movement of said rider.

3. In combination, a hopper, electrically actuated vibrators on the walls of said hopper, a conveyor beneath said hopper, a rider vertically movable above said conveyor, contact devices electrically connected to said vibrators, a rock shaft and arms operatively connecting said rider and said contact devices, said arms adapted to actuate said contact devices in succession, one of said contact devices electrically connected to a vibrator and a second contact device connected to another vibrator, for the purposes set forth.

In testimony whereof, we affix our signatures.

EDGAR D. CHURCH.
FRANK S. LASH.
JACKSON W. VAN BRUNT.